(12) United States Patent
Åberg et al.

(10) Patent No.: US 11,003,936 B2
(45) Date of Patent: May 11, 2021

(54) METHOD AND SYSTEM FOR CONTROLLING AN EYE TRACKING SYSTEM

(71) Applicant: Tobii AB, Danderyd (SE)

(72) Inventors: Viktor Åberg, Danderyd (SE); Anna Redz, Danderyd (SE); Niklas Ollesson, Danderyd (SE); Dineshkumar Muthusamy, Danderyd (SE); Magnus Ivarsson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/901,809

(22) Filed: Jun. 15, 2020

(65) Prior Publication Data

US 2021/0004623 A1    Jan. 7, 2021

(30) Foreign Application Priority Data

Jun. 14, 2019 (SE) .................................... 1950726-8

(51) Int. Cl.
| | |
|---|---|
| *G06K 9/20* | (2006.01) |
| *G06T 7/246* | (2017.01) |
| *H04N 5/235* | (2006.01) |
| *G06K 9/46* | (2006.01) |
| *G06K 9/00* | (2006.01) |

(52) U.S. Cl.
CPC ....... *G06K 9/2027* (2013.01); *G06K 9/00604* (2013.01); *G06K 9/4661* (2013.01); *G06T 7/246* (2017.01); *H04N 5/2354* (2013.01); *G06T 2207/10152* (2013.01); *G06T 2207/30201* (2013.01)

(58) Field of Classification Search
CPC .............. G06K 9/2027; G06K 9/4661; G06K 9/00604; H04N 5/2354; G06T 7/246; G06T 2207/10152; G06T 2207/30201
See application file for complete search history.

(56) References Cited

U.S. PATENT DOCUMENTS

| | | | |
|---|---|---|---|
| 5,231,674 A * | 7/1993 | Cleveland | A61B 3/113 351/210 |
| 9,940,518 B1 * | 4/2018 | Klingstrom | G06T 7/60 |
| 2006/0147094 A1 * | 7/2006 | Yoo | G06K 9/0061 382/117 |
| 2007/0036396 A1 * | 2/2007 | Sugita | A61B 3/112 382/117 |

(Continued)

*Primary Examiner* — James M Pontius
(74) *Attorney, Agent, or Firm* — Samuel I. Yamron

(57) ABSTRACT

There is provided a method, system, and non-transitory computer-readable storage medium for controlling an eye tracking system to optimize eye tracking performance under different lighting conditions, by obtaining a first image captured using a camera associated with the eye tracking system, the first image comprising at least part of an iris and at least part of a pupil of an eye illuminated by an illuminator associated with the eye tracking system at a current power of illumination selected from a set of predetermined power levels; determining a contrast value between an the iris and the pupil in the image; and, if the contrast value deviates less than a preset deviation threshold value from a preset minimum contrast value, setting the current power of illumination of the illuminator to the other predetermined power level in the set of predetermined power levels.

17 Claims, 5 Drawing Sheets

(56) References Cited

U.S. PATENT DOCUMENTS

| | | | |
|---|---|---|---|
| 2008/0273763 A1* | 11/2008 | Martin | G06K 9/0061 |
| | | | 382/117 |
| 2009/0247998 A1* | 10/2009 | Watanabe | A61F 9/008 |
| | | | 606/5 |
| 2010/0057059 A1* | 3/2010 | Makino | A61F 9/00804 |
| | | | 606/4 |
| 2010/0328444 A1* | 12/2010 | Blixt | A61B 3/145 |
| | | | 348/78 |
| 2015/0061995 A1* | 3/2015 | Gustafsson | G06F 3/013 |
| | | | 345/156 |
| 2015/0161472 A1* | 6/2015 | Yoshioka | G06K 9/0061 |
| | | | 382/197 |
| 2016/0227113 A1* | 8/2016 | Horesh | G06K 9/2027 |
| 2016/0274659 A1* | 9/2016 | Caraffi | G06F 3/013 |
| 2016/0302658 A1* | 10/2016 | Cherchi | A61B 5/4863 |
| 2017/0017299 A1* | 1/2017 | Biedert | G02B 27/0172 |
| 2019/0302882 A1* | 10/2019 | Blixt | A61B 3/113 |
| 2019/0303646 A1* | 10/2019 | Sjostrand | G06K 9/0061 |
| 2020/0183490 A1* | 6/2020 | Klingstrom | G06K 9/0061 |

* cited by examiner

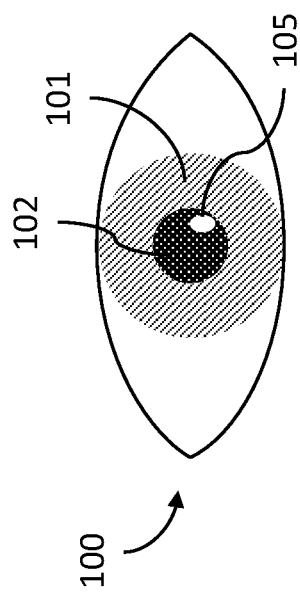
FIG. 1
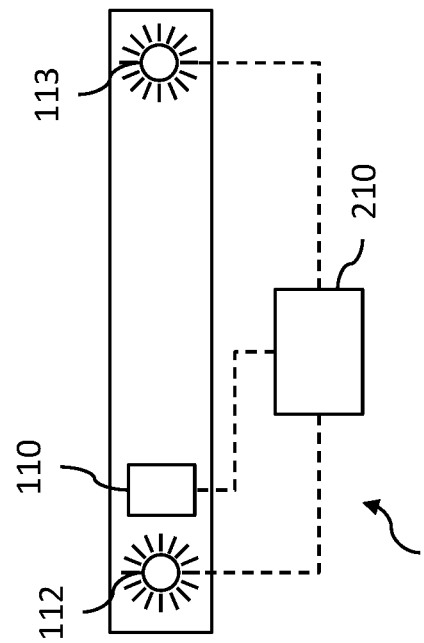
FIG. 3
FIG. 2

METHOD AND SYSTEM FOR CONTROLLING AN EYE TRACKING SYSTEM

CROSS REFERENCE TO RELATED APPLICATIONS

This application claims priority to Swedish Application No. 1950726-8, filed Jun. 14, 2019; the content of which are hereby incorporated by reference.

TECHNICAL FIELD

The present disclosure generally relates to the field of eye tracking. In particular, the present disclosure relates to controlling an eye tracking system to optimize eye tracking accuracy.

BACKGROUND

Several different eye tracking systems are known in the art. Such systems may for example be employed to allow a user to indicate a location at a computer display by looking at that point. The eye tracking system may capture images of the user's face, and then employ image processing to extract key features from the user's face, such as a pupil center and glints from illuminators illuminating the user's face. The extracted features may then be employed to determine where at the display the user is looking. Naturally, factors such as accuracy, speed, and reliability/robustness of the eye tracking are desirable to achieve a positive user experience. Therefore, several schemes have been proposed for mitigating the negative effects of different types of errors or inaccuracies that may occur in eye tracking systems.

For example, US 2010/0328444 A1 (which is incorporated by reference herein in its entirety) discloses an eye tracker which includes at least one illuminator for illuminating an eye, at least two cameras for imaging the eye, and a controller. The configuration of the illuminator(s) and cameras is such that, at least one camera is coaxial with a reference illuminator and at least one camera is non-coaxial with a reference illuminator. The controller is adapted to select one of the cameras to be active to maximize an image quality metric and to avoid obscuring objects. The eye tracker is operable in a dual-camera mode to improve accuracy. A method and computer-program product for selecting a combination of an active reference illuminator from a number of reference illuminators, and an active camera from a plurality of cameras are also disclosed.

A disadvantage with this solution is that multiple cameras and illuminators are necessary, which adds cost and complexity to the eye tracking system. A further disadvantage is that the algorithms for selecting a combination of an active illuminator and an active camera from multiple reference illuminators and multiple cameras are complex and computationally expensive.

In order to be able to perform eye tracking, the pupil of a user eye, and at least one glint, must be identified in an image captured by a camera associated with the eye tracking system. Many remote eye trackers use two kinds of images for pupil detection: bright pupil (BP) images and dark pupil (DP) images. A BP image is captured with active illumination on the camera axis, which results in light reflecting off the user's retina and back to the camera, resulting in a bright pupil (BP effect) in the captured image. For eye tracking, the contrast between pupil and iris is very important, as this is what makes it possible to distinguish the pupil from the iris in the image, and thus identify the pupil in the image. An image in which there is low contrast between the pupil and iris is herein referred to as a grey pupil image. In both BP and DP images, active illumination is also needed to generate the at least one glint.

When capturing eye images for gaze estimation and/or eye tracking in high ambient light, typically sun, intended BP images can become more of grey pupil images, or even resemble DP images. This is because we obtain the BP effect from the active illumination reflecting of the retina, but we also get a lot of light from the sun or other ambient light source that reflects of the iris towards the camera, but does not contribute to the BP effect. Thereby, the BP effect decreases, or in other words the resulting contrast between the iris and the pupil in the captured images is reduced, due to the ambient light. Grey pupils make the pupil very hard or impossible to detect by image processing means, as it is very hard or even impossible to distinguish from the surrounding iris, thus significantly reducing the eye tracking performance.

As a consequence, pupil detection is un-reliable in situations where there is a weak BP effect, i.e. when the pupil-iris contrast is weak when running in BP mode. This is typically when there are high levels of ambient light from the sun or one or more other ambient light sources.

It would be desirable to provide further systems and methods addressing at least one of the issues described above.

SUMMARY

An object of the present disclosure is to address at least one of the issues described above.

A further object is to provide improved control of an eye tracking system in order to optimize its performance, i.e. the eye tracking result, under different lighting conditions. Yet a further object is to do this in a cost efficient and low complexity manner.

According to a first aspect, the objects are achieved by a method for controlling an eye tracking system, the method comprising: obtaining, in the eye tracking system, a first image captured using a camera associated with the eye tracking system, the first image comprising at least part of an iris and at least part of a pupil of the eye illuminated by an illuminator associated with the eye tracking system at a current power of illumination selected from a set of a first predetermined power level and a second predetermined power level, wherein the value of the first predetermined power level is different from the value of the second predetermined power level. The method further comprises obtaining, in the eye tracking system, pixel coordinates of at least one pixel in the first image that is associated with the iris of the eye and pixel coordinates of at least one pixel associated with the pupil of the eye and determining, by the eye tracking system, a contrast value of the first image as a function $f(x_1, x_2)$, wherein $x_1$ is an intensity value of the at least one pixel in the first image that is associated with the iris and wherein $x_2$ is an intensity value of the at least one pixel in the first image that is associated with the pupil. Thereafter, the method comprises comparing, by the eye tracking system, the contrast value of the first image to a minimum contrast value calculated as the function $f(x_1, x_2)$ when $x_1=x_2$ and, if the contrast value of the first image deviates less than a preset deviation threshold value from the minimum contrast value, setting, by the eye tracking system, the current power of illumination of the illuminator to the other predetermined power level in the set of predetermined power levels.

The method may be iterated, i.e. performed repeatedly, to continuously control the eye tracking system to, if necessary due to low image quality in the form of low contrast, adjust the active illumination to perform optimally under the present lighting conditions.

One of the first predetermined power level and the second predetermined power level is within a first predetermined range including the maximum illumination power of the illuminator and power values directly below the maximum illumination power to a first preset threshold value. The other one of the first and second predetermined power levels is within a second predetermined range including a predetermined minimum threshold value and power values directly above the predetermined minimum threshold value to a second preset threshold value. Thereby, the illuminator is controlled to switch between a power level wherein maximum or close to maximum BP effect is obtained, and a power level wherein almost no BP effect is obtained, depending on what will provide the best contrast between iris and pupil in a captured image.

In some embodiments, the first image comprises at least part of an iris and at least part of a pupil of the eye illuminated by the illuminator at the predetermined power level within the first predetermined range, and wherein the current power of illumination of the illuminator has then been set to the predetermined power level within the second predetermined range. In these embodiments, the method further comprises: a) obtaining a second image, captured using the camera associated with the eye tracking system, the second image comprising at least part of an iris and at least part of a pupil of the eye illuminated by the illuminator at the predetermined power level within the second predetermined range; b) detecting, by the eye tracking system, any glint present in the second image; and c) if no glint can be detected in the second image, increasing the current power of illumination by a first preset amount, by the eye tracking system, and repeating steps a to c. Thereby, if the lower power level is used and it turns out that the illumination of this power level is so low that no glint can be detected in the captured image, the illumination power of the illuminator is increased stepwise until a glint is again detectable in a captured image. In some embodiments, once a glint has been detected, the method may further comprise: a) obtaining a third image, captured using the camera associated with the eye tracking system, the third image comprising at least part of an iris and at least part of a pupil of the eye illuminated by the illuminator at the current power of illumination; b) obtaining, in the eye tracking system, pixel coordinates of at least one pixel in the third image that is associated with the iris of the eye and pixel coordinates of at least one pixel associated with the pupil of the eye; c) determining, by the eye tracking system, a contrast value of the third image as a function $f(x_1, x_2)$, wherein $x_1$ is an intensity value of the at least one pixel in the third image that is associated with the iris and wherein $x_2$ is an intensity value of the at least one pixel in the third image that is associated with the pupil; and d) if the contrast value of the third image deviates less than the preset deviation threshold value from the minimum contrast value, decreasing the current power of illumination by a second preset amount, by the eye tracking system, and repeating steps a to d. Thereby, if the illumination power has been increased too much by the stepwise increase, so that the contrast between iris and pupil has become too low and the pupil cannot be reliably detected, the illumination power is decreased stepwise until the contrast is acceptable. The decease steps may be smaller than the increase steps.

In one or more embodiment, the method further comprises detecting, by the eye tracking system, a pupil of an eye of a user of the eye tracking system.

In one or more embodiment, the method further comprises performing eye tracking, using the eye tracking system.

According to a second aspect, the objects are achieved by an eye tracking system, the system comprising processing circuitry configured to: obtain an first image captured using a camera associated with the eye tracking system, the image comprising at least part of an iris and at least part of a pupil of the eye illuminated by an illuminator associated with the eye tracking system at a current power of illumination selected from a set of a first predetermined power level and a second predetermined power level, wherein the value of the first predetermined power level is different from the value of the second predetermined power level; obtain pixel coordinates of at least one pixel in the image that is associated with the iris of the eye and pixel coordinates of at least one pixel associated with the pupil of the eye; determine a contrast value of the first image as a function $f(x_1, x_2)$, wherein $x_1$ is an intensity value of the at least one pixel in the first image that is associated with the iris and wherein $x_2$ is an intensity value of the at least one pixel in the first image that is associated with the pupil; compare the contrast value of the first image to a minimum contrast value calculated as the function $f(x_1, x_2)$ when $x_1=x_2$; and if the contrast value of the first image deviates less than a preset deviation threshold value from the minimum contrast value, set the current power of illumination of the illuminator to the other predetermined power level in the set of predetermined power levels. The processing circuitry may be configured to perform these actions repeatedly.

In some embodiments, wherein the first image comprises at least part of an iris and at least part of a pupil of the eye illuminated by the illuminator at the predetermined power level within the first predetermined range, and wherein the current power of illumination of the illuminator has then been set to the predetermined power level within the second predetermined range, wherein the processing circuitry may be configured to: a) obtain a second image, captured using the camera associated with the eye tracking system, the second image comprising at least part of an iris and at least part of a pupil of the eye illuminated by the illuminator at the predetermined power level within the second predetermined range; b) detect any glint present in the second image; and c) if no glint can be detected in the second image, increase the current power level of illumination by a first preset amount, and repeat steps a to c. In these embodiments, the processing circuitry may further be configured to, once a glint has been detected: a) obtain a third image, captured using the camera associated with the eye tracking system, the third image comprising at least part of an iris and at least part of a pupil of the eye illuminated by the illuminator at the current power of illumination; b) obtain pixel coordinates of at least one pixel in the third image that is associated with the iris of the eye and pixel coordinates of at least one pixel associated with the pupil of the eye; c) determine a contrast value of the third image as a function $f(x_1, x_2)$, wherein $x_1$ is an intensity value of the at least one pixel in the third image that is associated with the iris and wherein $x_2$ is an intensity value of the at least one pixel in the third image that is associated with the pupil; and d) if the contrast value of the third image deviates less than the preset deviation threshold value from the minimum contrast value, decrease the current power level of illumination by a second preset amount, and repeating steps a to d.

The processing circuitry may further be configured to detect a pupil of an eye (100) of a user of the eye tracking system.

The system may further be configured to perform eye tracking.

According to a third aspect, the objects are achieved by a non-transitory computer-readable storage medium storing instructions which, when executed by processing circuitry of a system, cause the system to: obtain, in the eye tracking system, a first image captured using a camera associated with the eye tracking system, the first image comprising at least part of an iris and at least part of a pupil of the eye illuminated by an illuminator associated with the eye tracking system at a current power of illumination selected from a set of a first predetermined power level and a second predetermined power level, wherein the value of the first predetermined power level is different from the value of the second predetermined power level; obtain, in the eye tracking system, pixel coordinates of at least one pixel in the first image that is associated with the iris of the eye and pixel coordinates of at least one pixel associated with the pupil of the eye; determine, by the eye tracking system, a contrast value of the first image as a function $f(x_1, x_2)$, wherein $x_1$ is an intensity value of the at least one pixel in the first image that is associated with the iris and wherein $x_2$ is an intensity value of the at least one pixel in the first image that is associated with the pupil; compare by the eye tracking system, the contrast value of the first image to a minimum contrast value calculated as the function $f(x_1, x_2)$ when $x_1=x_2$; and if the contrast value of the first image deviates less than a preset deviation threshold value from the minimum contrast value, set, by the eye tracking system, the current power of illumination of the illuminator to the other predetermined power level in the set of predetermined power levels. The non-transitory computer-readable storage medium may further store instructions which, when executed by processing circuitry of a system, cause the system perform these method steps repeatedly.

The non-transitory computer-readable storage medium may further store instructions which, when executed by processing circuitry of a system, cause the system to perform the method steps of any of the appended method claims.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In the following, example embodiments will be described in greater detail with reference to the accompanying drawings, in which:

FIG. 1 is a front view of an eye;

FIG. 2 shows a schematic overview of an eye tracking system, according to one or more embodiments;

FIG. 3 shows a schematic overview of an eye tracking system, according to one or more embodiments;

Figure 4:
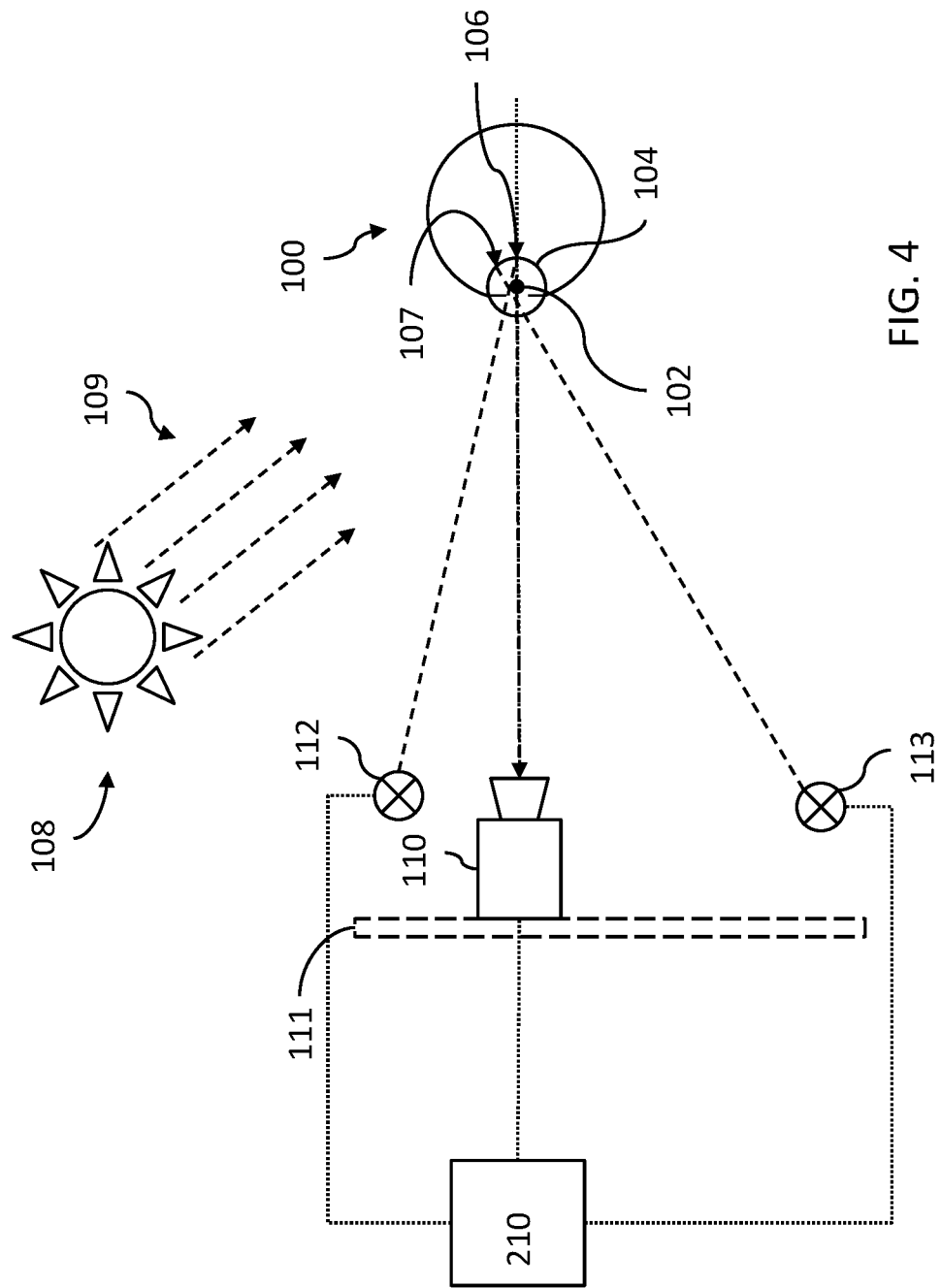
FIG. 4 shows a schematic overview of an eye of a user and components of an eye tracking system, according to one or more embodiments.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Embodiments of the present disclosure aim at solving, or at least ameliorating, the ensuing problem that under certain lighting conditions, the pupil of the user's eye is hard, or even impossible, to detect in an image of the eye, thereby negatively effecting the result of the eye or gaze tracking.

Embodiments of the present disclosure further aim at solving the ensuing problem that prior solutions require multiple cameras and illuminators, which adds cost and complexity to the eye tracking system, and require complex and computationally expensive algorithms to control the eye tracking system.

Solutions to the problems are provided by the embodiments described herein, in the description and the appended claims.

One clear advantage of the eye tracking controlling according to embodiments herein is thus that the eye tracking or gaze tracking result becomes more accurate since the system will be able to detect the user's pupil on a greater number of occasions compared to prior solutions.

Another advantage is that the present solution is more independent on changing lighting conditions, and hence is more robust.

A further advantage is that the visual result and user experience is improved if the eye tracking or gaze tracking result becomes more accurate.

Yet another advantage is that only one illuminator and one camera is required for the eye tracking system to work, which reduces cost and complexity.

The term eye tracking as used herein may be understood as comprising any of: tracking or observing actual parts of an eye, in the real world, in a 3D model of the eye, in a 2D image depicting the eye; or determining what the eye is tracking or gazing towards. Determination of what the eye is tracking or gazing towards may also be referred to as gaze tracking.

Any embodiment described herein as referring to one eye, for instance a first eye, of a user is of course equally applicable to any of the user's eyes, and may also be performed for both the eyes of a user in parallel, or consecutively.

Throughout the present disclosure, the term obtaining information may be understood as receiving information, in a push fashion, and/or retrieving information, in a pull fashion. As a specific example, obtaining an image may in the context of this description be understood as: capturing an image, using an imaging device, for example a camera such as the camera 110; receiving an image, for example from an imaging device, which may be the camera 110, or from a memory; or retrieving an image, for example from an imaging device, which may be the camera 110, or from a memory.

Methods, systems and associated storage media for controlling an eye tracking system will be described below with reference to FIGS. 1-11. First, an illustrative example of an eye will be described with reference to FIG. 1 and FIG. 4.

FIG. 1 is a front view of an eye 100. FIG. 4 comprises a cross sectional view of the eye 100 from the side of the eye 100. While FIG. 4 shows more or less the entire eye 100, the front view presented in FIG. 1 only shows those parts of the eye 100 which are typically visible from in front of a person's face. The eye 100 has a cornea 104 through which an iris 101 and a pupil 102 are visible in the front view. The pupil 102 has a pupil center 103. In FIG. 1, a glint 105 is shown, caused by a reflection 106 of light reflected from the cornea 104 of the eye 100.

System Architecture

System embodiments will now be described with reference to FIGS. 2, 3 and 4.

FIGS. 2 and 3 are schematic overviews of an eye tracking system 200 comprising eye tracking equipment 220, and processing circuitry 210, according to one or more embodiments. FIG. 4 shows a schematic overview of an eye 100 of a user and components of an eye tracking system 200 comprising eye tracking equipment 220, and processing circuitry 210.

Turning first to FIGS. 2 and 3, there is shown an eye tracking system 200 comprising processing circuitry 210.

According to some embodiments, the system may comprise at least one illuminator for illuminating the eyes, and one or more cameras for capturing images of the eyes. The eye tracking system 200 (which may also be referred to as a gaze tracking system), according to an embodiment comprises, or is connected to or associated with, an illuminator 112. The eye tracking system 200 may further comprise, or be connected to or associated with, one or more illuminators 113, for illuminating the eyes of a user. The eye tracking system 200 further comprises an imaging device 110, for example a camera, for capturing images of the eyes of the user.

The illuminator 112 and the illuminator 113 may each be light emitting diodes emitting light in the infrared frequency band, or in the near infrared frequency (NIR) band, i.e. a near infrared (NIR) diode. The terms illuminator and diode may be understood as comprising a single illuminator or diode, or alternatively as comprising a group of two or more illuminators or diodes that are arranged very closely together and controlled to act as a single light source, i.e. which are controlled to operate such that they together cause a single glint when illuminated. The power level $PL_1$, $PL_2$ of the illuminator 112 in these cases refer to the total power output of the group of two or more illuminators or diodes.

Figure 6:
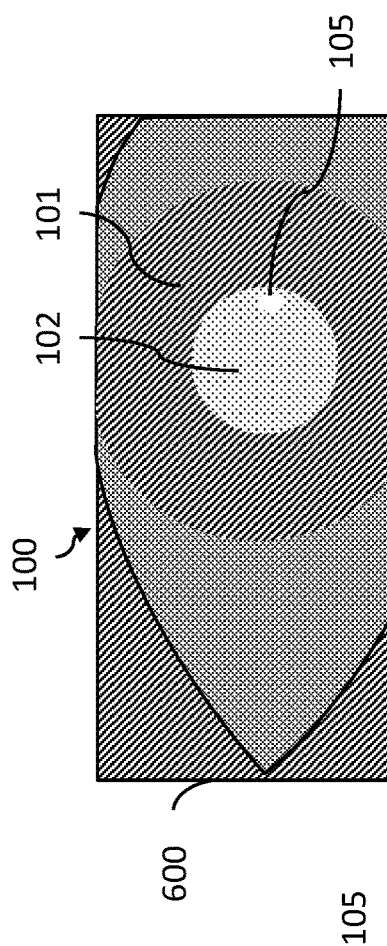
FIG. 6 is an illustration of a bright pupil image captured using a camera of an eye tracking system.

Preferably, the illuminator 112 is a bright pupil (BP) diode arranged coaxially with (or close to) the camera 110, or other imaging sensor 110, so that the camera 110 may capture bright pupil images of the user's eyes, if the illuminator 112 emits light at, or close to, its maximum power. In this case, due to the coaxial arrangement of the illuminator 112 and the camera, or other imaging sensor, 110, light reflected from the retina of an eye 100, at point 106, returns back out through the pupil 102 towards the camera 110, so that the pupil 102 appears brighter than the iris 101 surrounding it in images where the illuminator 112 illuminates the eye. Thereby, the eye tracking system 200 is configured to obtain BP images of the user's eye 100. In FIG. 6, an example of a BP image 600 is shown.

The optional one or more second illuminator 113 may be arranged non-coaxially with (or further away from) the camera 110 for capturing dark pupil (DP) images. Due to the non-coaxial arrangement of the one or more second illuminator 113 and the camera 110, light reflected from the retina of an eye 100, at point 107, does not reach the camera 110 and the pupil appears darker than the iris surrounding it in images where a second illuminator 113 illuminates the eye.

The imaging device 110 may for example be a camera, such as a complementary metal oxide semiconductor (CMOS) camera or a charged coupled device (CCD) camera. Hereinafter, the imaging device 110 may be referred to as a camera 110.

FIG. 4 also shows, for purpose of understanding, a screen 111 towards which the user eye 100 is gazing.

In one or more embodiment, the processing circuitry 210 of the eye tracking system 200 is configured to: obtain an first image captured using a camera 110 associated with the eye tracking system 200, the image comprising at least part of an iris 101 and at least part of a pupil 102 of the eye 100 illuminated by an illuminator 112 associated with the eye tracking system 200 at a current power of illumination $P_{CURRENT}$ selected from a set of a first predetermined power level $PL_1$ and a second predetermined power level $PL_2$, wherein the value of the first predetermined power level $PL_1$ is different from the value of the second predetermined power level $PL_2$; obtain pixel coordinates of at least one pixel in the image that is associated with the iris 101 of the eye 100 and pixel coordinates of at least one pixel associated with the pupil 102 of the eye 100; determine a contrast value of the first image as a function $f(x_1, x_2)$, wherein $x_1$ is an intensity value of the at least one pixel in the first image that is associated with the iris 101 and wherein $x_2$ is an intensity value of the at least one pixel in the first image that is associated with the pupil 102; compare the contrast value of the first image to a minimum contrast value calculated as the function $f(x_1, x_2)$ when $x_1=x_2$; and if the contrast value of the first image deviates less than a preset deviation threshold value $T_{DEV}$ from the minimum contrast value, set the current power of illumination of the illuminator 112 to the other predetermined power level in the set of predetermined power levels $PL_1$, $PL_2$.

The processing circuitry 210 may further be configured to perform the above functions repeatedly.

In different embodiments, one of the first predetermined power level $PL_1$ and the second predetermined power level $PL_2$ may lie within a first predetermined range $R_1$ including the maximum illumination power $P_{MAX}$ of the illuminator 112 and power values directly below the maximum illumination power $P_{MAX}$ to a first preset threshold value $T_1$. The other one of the first and second predetermined power levels $PL_1$, $PL_2$ may lie within a second predetermined range $R_2$ including a predetermined minimum threshold value $T_{MIN}$ and power values directly above the predetermined minimum threshold value $T_{MIN}$ to a second preset threshold value $T_2$.

In some embodiments, wherein the first image comprises at least part of an iris 101 and at least part of a pupil 102 of the eye 100 illuminated by the illuminator 112 at the predetermined power level within the first predetermined range $R_1$, and wherein the current power of illumination of the illuminator 112 has then been set to the predetermined power level within the second predetermined range $R_2$, wherein the processing circuitry 210 is further configured to: obtain a second image, captured using the camera 110 associated with the eye tracking system 200, the second image comprising at least part of an iris 101 and at least part of a pupil 102 of the eye 100 illuminated by the illuminator 112 at the predetermined power level within the second predetermined range $R_2$. The processing circuitry 210 is in these embodiments further configured to detect any glint 105 present in the second image; and if no glint 105 can be detected in the second image, increase the current power level of illumination by a first preset amount, and repeat steps a to c.

In an embodiment wherein a glint 105 has been detected, the processing circuitry 210 may further be configured to obtain a third image, captured using the camera 110 associated with the eye tracking system 200, the third image comprising at least part of an iris 101 and at least part of a pupil 102 of the eye 100 illuminated by the illuminator 112 at the current power of illumination; obtain pixel coordinates of at least one pixel in the third image that is associated with the iris 101 of the eye 100 and pixel coordinates of at least one pixel associated with the pupil 102 of the eye 100; determine a contrast value of the third image as a function $f x_1, x_2$, wherein $x_1$ is an intensity value of the at least one pixel in the third image that is associated with the iris 101 and wherein $x_2$ is an intensity value of the at least one pixel in the third image that is associated with the pupil 102; and if the contrast value of the third image deviates less than the preset deviation threshold value $T_{DEV}$ from the minimum contrast value, decrease the current power level of illumination by a second preset amount, and then repeating the steps of this embodiments.

The processing circuitry 210 of the eye tracking system 200 may further be configured to detect a pupil 102 of an eye 100 of a user of the eye tracking system 200.

The eye tracking system 200 may further be configured to perform eye tracking, with the improved robustness in pupil detection due to the illumination control of embodiments presented herein.

Figure 5:
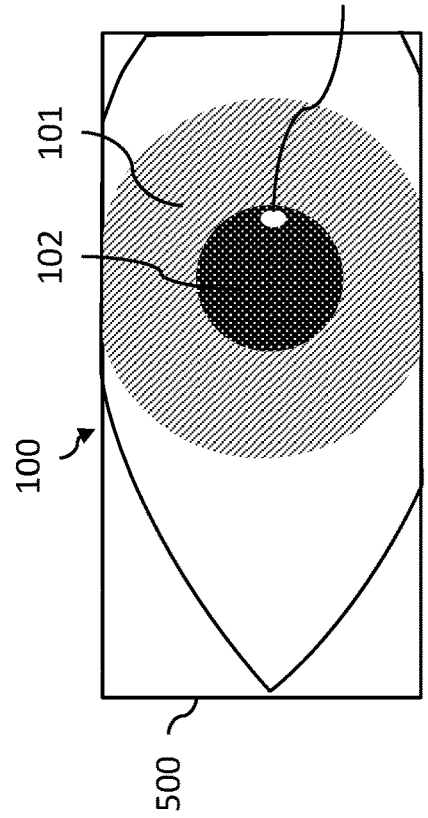
FIG. 5 is an illustration of a dark pupil image captured using a camera of an eye tracking system.

FIG. 5 is an illustration of a dark pupil image 500 captured using a camera 110 of an eye tracking system 200 according to one or more embodiment presented herein.

FIG. 6 is an illustration of a bright pupil image 600 captured using a camera 110 of an eye tracking system 200 according to one or more embodiment presented herein.

Figure 7:
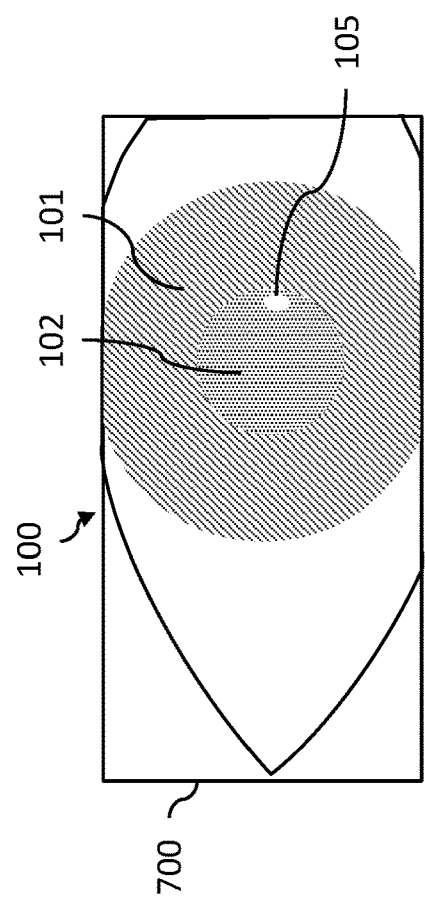
FIG. 7 is an illustration of a grey pupil image captured using a camera of an eye tracking system.

FIG. 7 is an illustration of a grey pupil image 700 captured using a camera 110 of an eye tracking system 200 according to one or more embodiment presented herein.

Figure 8:
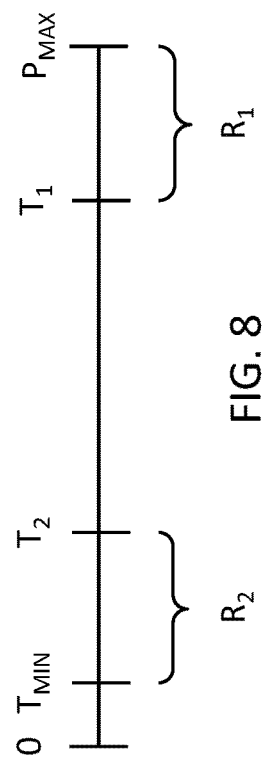
FIG. 8 is a plot illustrating a first and a second power level.

FIG. 8 is a plot illustrating a first and a second power level PL1, PL2.

The display optics is to be understood as comprising any optics suitable for generating and/or displaying 2D image data, 3D image data, graphical data, holographic data or other content that may be presented to a user/wearer of the head-mounted device to convey a VR, AR, MR or other XR experience. The display optics may comprise one or more displays 111, e.g. a single display 111 located in front of the eyes of the user 270, or one display 111 located in front of a first eye 100 of the user 270 and a second display located in front of a second eye of the user 270. In other words, the term head-mounted device may, but should not necessarily, be construed as only referring to the actual display optics intended to be arranged in front of an eye of the user, or in front of both eyes of the user.

The one or more cameras may for example be charged-coupled device (CCD) cameras or Complementary Metal Oxide Semiconductor (CMOS) cameras. However, other types of cameras may also be envisaged.

The system 200 may further comprise, or be communicatively connected to, a display 111. The display 111 may for example be a liquid-crystal display (LCD) or a LED display. However, other types of displays may also be envisaged. The display may for example be flat or curved. The display 111 may for example be placed in front of one of the user's eyes.

The processing circuitry 210 may for example comprise one or more processors. The processor(s) may for example be application-specific integrated circuits (ASIC) configured to perform a specific eye tracking and position determination method. Alternatively, the processor(s) may be configured to execute instructions (for example in the form of a computer program) stored in one or more memories 140. Such a memory 140 may for example be comprised in the system 200, or may be external to (for example located remotely from) the system 200. The memory 140 may store instructions for causing the system 200 to perform a method according to any of the embodiments presented in connection with FIG. 2.

The processing circuitry 210 may in one or more embodiment be configured to perform any or all of the method embodiments described in connection with FIG. 4.

It will be appreciated that the system 200 embodiments described above with reference to FIGS. 2, and 3 is provided as examples, and that many other systems may be envisaged. For example, the system 200 may consist only of the processing circuitry 210.

METHOD EMBODIMENTS

In the following, method embodiments will be described in connection with FIG. 9.

Figure 9:
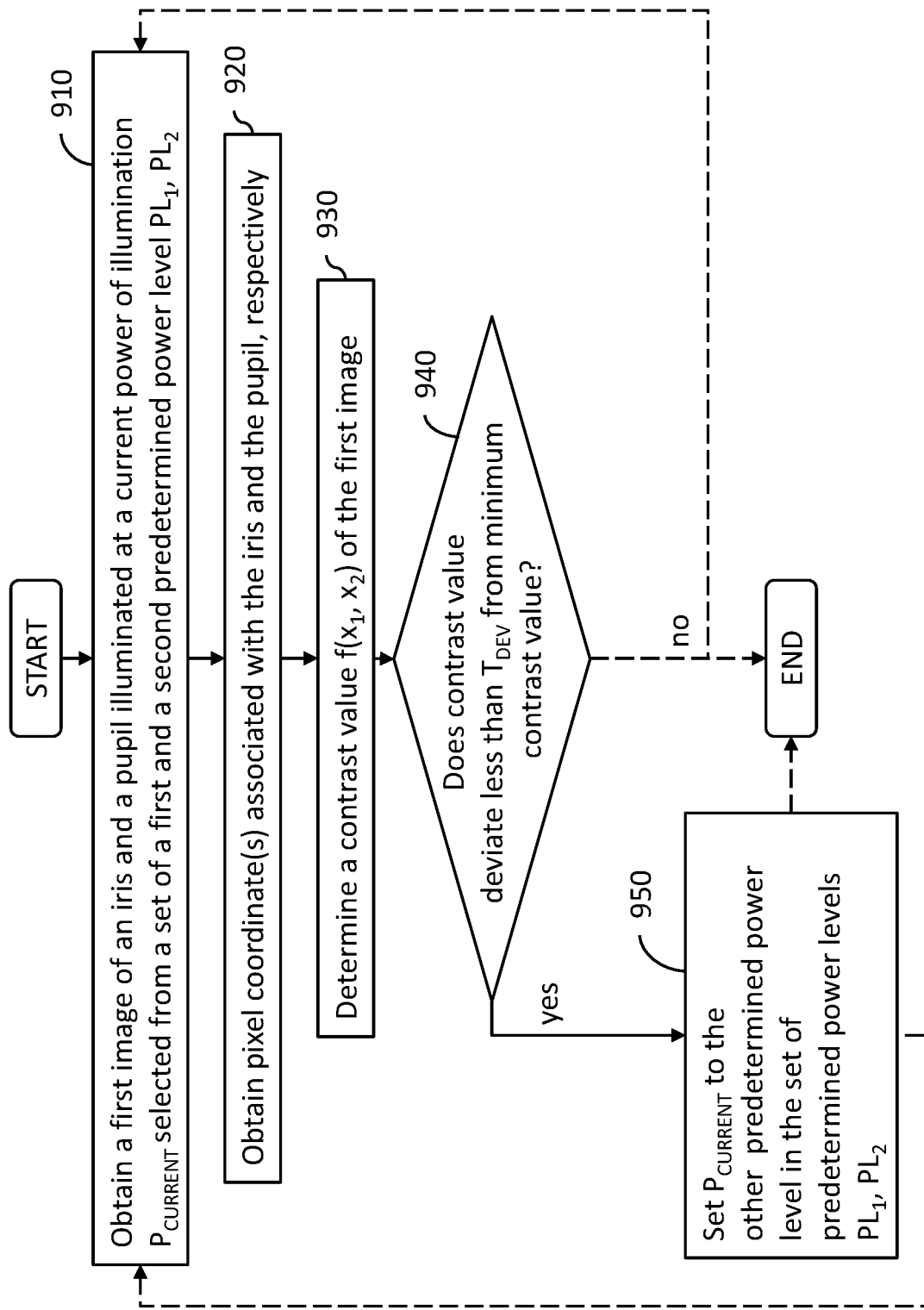
FIG. 9 is a flow chart of a method according to or more embodiments.

FIG. 9 shows embodiments of a method for controlling an eye tracking system, the method comprising:

In step 910: obtaining, in the eye tracking system 200, a first image captured using a camera 110 associated with the eye tracking system 200, the first image comprising at least part of an iris 101 and at least part of a pupil 102 of the eye 100 illuminated by an illuminator 112 associated with the eye tracking system 200 at a current power of illumination $P_{CURRENT}$ selected from a set of a first predetermined power level $PL_1$ and a second predetermined power level $PL_2$, wherein the value of the first predetermined power level $PL_1$ is different from the value of the second predetermined power level $PL_2$.

In one or more embodiments, one of the first predetermined power level $PL_1$ and the second predetermined power level $PL_2$ is within a first predetermined range $R_1$ including the maximum illumination power $P_{MAX}$ of the illuminator 112 and power values directly below the maximum illumination power $P_{MAX}$ to a first preset threshold value $T_1$; and the other one of the first and second predetermined power levels $PL_1$, $PL_2$ is within a second predetermined range $R_2$ including a predetermined minimum threshold value $T_{MIN}$ and power values directly above the predetermined minimum threshold value $T_{MIN}$ to a second preset threshold value $T_2$. This is illustrated in FIG. 8.

The first predetermined range $R_1$ as well as the first predetermined range $R_2$ may for example each span a few tenths of a watt. The span may be set in production and/or be adjustable during calibration or operation. The span of the first predetermined range $R_1$ also depends on the maximum illumination power $P_{MAX}$ of the illuminator 112, while the span of the second predetermined range $R_1$ depends on which is the lowest illumination power of the illuminator 112 at which the system is still able to produce a glint caused by the illuminator 112 in an image captured by the camera 110. As a non-limiting example, if the maximum illumination power $P_{MAX}$ of the illuminator 112 is around 3 W, the first predetermined range $R_1$ may be 1-1.5 W, or there around, and the second predetermined range $R_2$ may be around 2.5-3 W, but other ranges may be more suitable depending on circumstances.

Preferably, the predetermined power level that is within the first predetermined range $R_1$ is equal to the maximum illumination power $P_{MAX}$ of the illuminator 112, or substantially equal to $P_{MAX}$.

Preferably, the predetermined power level that is within the second predetermined range $R_2$ is close to, but above, the predetermined minimum threshold value $T_{MIN}$.

$T_{MIN}$ is set to, as close as possible to, the lowest possible illumination power at which the illuminator is still able to generate a detectable glint in a an image captured using the camera 110 associated with the eye tracking system 200. In other words, there must always be active illumination, since active illumination is needed to generate the at least one glint required for the eye tracking.

In step 920: obtaining, in the eye tracking system 200, pixel coordinates of at least one pixel in the first image that is associated with the iris 101 of the eye 100 and pixel coordinates of at least one pixel associated with the pupil 102 of the eye 100.

Obtaining the pixel coordinates associated with the iris 101 and the pupil 102, respectively, may be done by inputting the first image into a machine learning network configured to identifying the pupil, and further configured to determine the border between the pupil 102 and the iris 101. The machine learning network may be trained to find the pupil and iris based on substantive training on similar images, and may for example base the detection on expected position in the image, expected In step 930: determining, by the eye tracking system 200, a contrast value of the first image as a function $f(x_1, x_2)$, wherein $x_1$ is an intensity value of the at least one pixel in the first image that is associated with the iris 101 and wherein $x_2$ is an intensity value of the at least one pixel in the first image that is associated with the pupil 102.

If more than one pixel associated with the iris 101 is obtained in step 920, the intensity value of the at least one pixel may e.g. be determined as the mean or median value of the intensity values of the more than one pixels; as the intensity value of the center pixel in the group of more than one pixels; as the intensity value of one selected pixel, for instance the one closest to the pupil edge; or according to any other suitable method.

To determining the intensity value of the at least one pixel in the first image that is associated with the pupil 102, any of the above methods may likewise be applied.

In an embodiment, the contrast value is calculated as the intensity of the pupil 102 divided by the intensity of the iris 101 according to any of Equations 1a to 1d.

$$f(x_1, x_2) = \frac{x_2}{x_1} \qquad \text{(Eq. 1a)}$$

$$f(x_1, x_2) = \left|\frac{x_2}{x_1}\right| \qquad \text{(Eq. 1b)}$$

$$f(x_1, x_2) = \frac{x_1}{x_2} \qquad \text{(Eq. 1c)}$$

$$f(x_1, x_2) = \left|\frac{x_1}{x_2}\right| \qquad \text{(Eq. 1d)}$$

In other embodiments, the contrast value may be calculated according to any of the equations 2a to 4d, any combination or variation of equations 1a to 4d, or any other suitable function.

$$f(x_1, x_2) = \frac{(x_1 - x_2)}{x_1} \qquad \text{(Eq. 2a)}$$

$$f(x_1, x_2) = \left|\frac{x_1 - x_2}{x_1}\right| \qquad \text{(Eq. 2b)}$$

$$f(x_1, x_2) = \frac{(x_2 - x_1)}{x_2} \qquad \text{(Eq. 2c)}$$

$$f(x_1, x_2) = \left|\frac{x_2 - x_1}{x_2}\right| \qquad \text{(Eq. 2d)}$$

$$f(x_1, x_2) = |x_1 - x_2| \qquad \text{(Eq. 3a)}$$

$$f(x_1, x_2) = |x_2 - x_1| \qquad \text{(Eq. 3b)}$$

$$f(x_1, x_2) = \frac{(x_1 - x_2)}{\max(x_1, x_2)} \qquad \text{(Eq. 4a)}$$

$$f(x_1, x_2) = \left|\frac{x_1 - x_2}{\max(x_1, x_2)}\right| \qquad \text{(Eq. 4b)}$$

$$f(x_1, x_2) = \frac{(x_2 - x_1)}{\max(x_1, x_2)} \qquad \text{(Eq. 4c)}$$

$$f(x_1, x_2) = \left|\frac{x_2 - x_1}{\max(x_1, x_2)}\right| \qquad \text{(Eq. 4d)}$$

In step 940: comparing, by the eye tracking system 200, the contrast value of the first image to a minimum contrast value calculated as the function $f(x_1, x_2)$ when $x_1 = x_2$.

Depending on how the contrast values are defined, the minimum contrast value may for example be 0, 1, 100%, 0%, or any of these values with a weight or constant added, etc., as is apparent to a person skilled in the art.

If the contrast value of the first image differs or deviates less than a preset deviation threshold value $T_{DEV}$ from the minimum contrast value, the method continues with Step 950.

In step 950: setting, by the eye tracking system 200, the current power of illumination $P_{CURRENT}$ of the illuminator 112 to the other predetermined power level in the set of predetermined power levels $PL_1$, $PL_2$.

In other words, assuming that the contrast value of the first image deviates less than a preset deviation threshold value $T_{DEV}$ from the minimum contrast value: if the illuminator 112 was first set to illuminate at the first power level $PL_1$, it will in step 950 be set to illuminate at the second power level $PL_2$, and vice versa.

The method according to any of the embodiments described in connection with FIG. 9 may be performed repeatedly. This is indicated in FIG. 9 by the dashed arrows leading from step 940 and 950, respectively, back to step 910. The method may for example be repeated every frame, or at certain preset time intervals, or in any other suitable manner. This setting may for instance be preset in the eye tracking system 200.

In a non-limiting use case example relating to the method of FIG. 9, consider that the first power level $PL_1$ is within the first range $R_1$ and the second power level $PL_2$ is within the second range $R_2$. Also consider that in this example, the first image, obtained in Step 910, is captured while the user's eye 100 is illuminated by the illuminator 112 at a current power of illumination $P_{CURRENT}$ corresponding to the first predetermined power level $PL_1$. In other words, the illuminator 112 is emitting light at or close to being at its maximum illumination power, whereby the first image is intended to be a bright pupil image, such as the image 600 illustrated in FIG. 6. In this example the user's eye is, as illustrated in FIG. 4, also illuminated by in-falling light 109 from the sun and/or another ambient light source 108. The ambient light 109 illuminates the iris 101 of the user's eye 100, but does not affect the pupil 102. In this example, the ambient light 109 is so bright that the one or more pixels associated with the iris 101, when depicted by the imaging device (e.g. camera 110) in the first image, has an intensity value very similar to that of the at least one pixel associated with the pupil 102. Thereby, instead of the intended BP image, a grey pupil image, such as the image 700 of FIG. 7, is obtained. The method described in connection with FIG. 9 detects this problem by determining a contrast value for the first image, representing the contrast between the intensity of pixel(s) depicting the pupil and pixel(s) depicting the iris of the eye, and further determining that this does not differ enough from a threshold value $T_{DEV}$, which is the contrast value between two pixels having the same exact contrast value, i.e. no contrast. If we would look at the image obtained, we would see a grey pupil image, such as image 700 illustrated in FIG. 7. When the problem of too low contrast between pupil pixels and iris pixels is determined, in other words when it has been determined that it will be very hard or impossible for the eye tracking system 200 to find the pupil in the image, the method solves this problem by in step 950 changing the illumination power of the illuminator 112 to $PL_2$. Now, when the next image is captured, the illuminator 112 will no longer act as a BP illuminator, but rather as a DP illuminator, since the illumination power is now very low. This means that the pupil 102 will be darker in the next obtained image. Assuming that the ambient lighting circumstances have not changed, we will thus have an image resembling the DP image 500 of FIG. 5, while still using the same illuminator 112 that was previously used as a BP illuminator. Should the ambient lighting conditions have changed such that the iris is no longer illuminated in the same manner and this means that the contrast between the pupil and iris is yet again too low, the method will detect this in step 940 and change back to the first illumination power level $PL_1$ in step 950 in the next iteration of the method.

Of course, the method might just as easily start with the illumination power being set to the lower illumination power level.

Figures 10, 11:
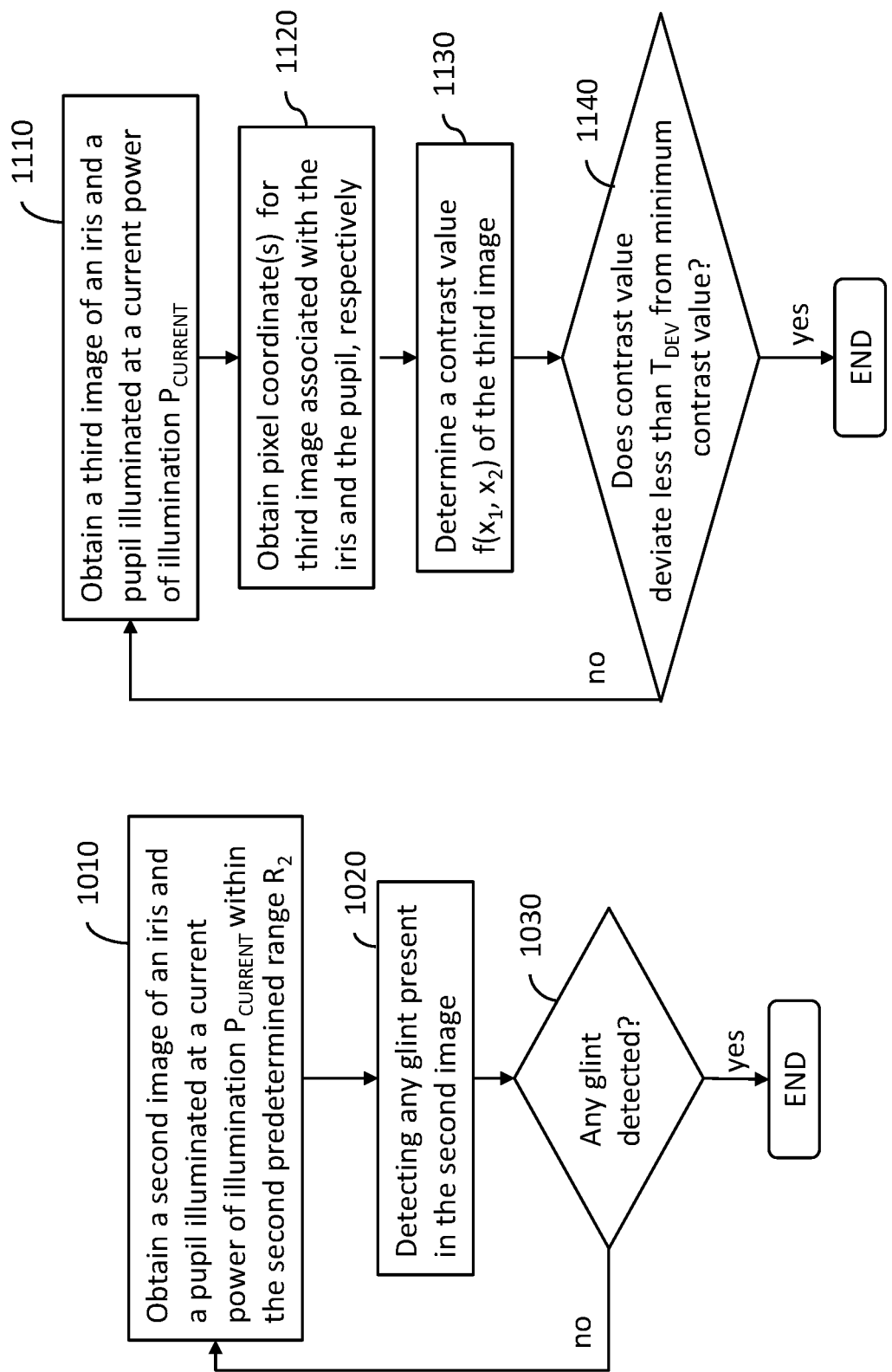
FIG. 10 is a flow chart of a method according to or more embodiments.
FIG. 11 is a flow chart of a method according to or more embodiments.

Turning now to FIG. 10, in embodiments wherein the first image comprises at least part of an iris 101 and at least part of a pupil 102 of the eye 100 illuminated by the illuminator 112 at the predetermined power level within the first predetermined range $R_1$, i.e. close to $P_{MAX}$, and wherein the current power of illumination of the illuminator 112 has then been set to the predetermined power level within the second predetermined range $R_2$ in step 950, the method may further comprise:

In step 1010: obtaining a second image, captured using the camera 110 associated with the eye tracking system 200, the second image comprising at least part of an iris 101 and at least part of a pupil 102 of the eye 100 illuminated by the illuminator 112 at the predetermined illumination power level within the second predetermined range $R_2$.

Since the illumination power level is now within the second range $R_2$, the image obtained will resemble a DP image.

In step 1020: detecting, by the eye tracking system 200, any glint 105 present in the second image.

In step 1030: if no glint 105 can be detected in the second image, increasing the current power of illumination $P_{CURRENT}$ by a first preset amount, by the eye tracking system 200, and repeating steps 1010 to 1030.

In other words, if we have changed the illumination power level to the lower level, thereby producing what resembles a DP image using the camera 110, level and the level is too low to generate a glint due to ambient light and/or other environmental conditions, we adjust the illumination power slightly before repeating the method. This may be described as setting $P_{CURRENT}$ to ($P_{CURRENT}$+first preset amount). Thereby, we decrease the risk that no glints will be detectable in the upcoming image, and hence increase the robustness of the functioning of the eye tracking system over time.

As some non-limiting examples, the first preset amount may be in the range of 0.01 W to 0.5 W, for example 0.01 W, 0.05 W, 0.1 W, 0.2 W, 0.03 W, 0.05 W or another suitable amount, depending on circumstances.

In some embodiments, the first preset amount is the same independent of the value of the current power of illumination $P_{CURRENT}$. Alternatively, the first preset amount may be dependent on the value of the current power of illumination $P_{CURRENT}$, such that a higher value of the current power of illumination $P_{CURRENT}$ leads to a higher first preset amount, i.e. a larger increase, and vice versa.

If at least one glint 105 is detected in Step 1030, the method may optionally further comprise the steps shown in FIG. 11, comprising:

In step 1110: obtaining a third image, captured using the camera (110) associated with the eye tracking system (200), the third image comprising at least part of an iris (101) and at least part of a pupil (102) of the eye (100) illuminated by the illuminator (112) at the current power of illumination.

The current power of illumination, since this step follows the method of FIG. 10, is the illumination power level within the second range $R_2$, i.e. the lower illumination power level.

In step 1120: obtaining, in the eye tracking system (200), pixel coordinates of at least one pixel in the third image that is associated with the iris (101) of the eye (100) and pixel coordinates of at least one pixel associated with the pupil (102) of the eye (100).

In step 1130: determining, by the eye tracking system (200), a contrast value of the third image as a function $f(x_1, x_2)$, wherein $x_1$ is an intensity value of the at least one pixel in the third image that is associated with the iris (101) and wherein $x_2$ is an intensity value of the at least one pixel in the third image that is associated with the pupil (102).

In step 1140: if the contrast value of the third image deviates less than the preset deviation threshold value ($T_{DEV}$) from the minimum contrast value, decreasing the current power of illumination by a second preset amount, by the eye tracking system (200), and repeating steps 1110 to 1140.

In other words, in this embodiment we have first determined in step 940 that the contrast value of the first image, captured using the higher (maximum) illumination power level, is too close to the minimum contrast value. Then we have changed to the lower (minimum) illumination power level, so this is the current power level of illumination. We have further concluded that also an obtained third image, captured while the user's eye was illuminated by the illuminator at the lower (minimum) illumination power level, also has a contrast value that is too close to the minimum contrast value. In order to obtain an improved contrast value in coming images, we decrease the power of illumination slightly. This may be described as setting $P_{CURRENT}$ to ($P_{CURRENT}$−second preset amount).

As some non-limiting examples, the second preset amount may be in the range of 0.01 W to 0.5 W, for example 0.01 W, 0.05 W, 0.1 W, 0.2 W, 0.03 W, 0.05 W or another suitable amount, depending on circumstances.

The method according to any of the embodiments described in connection with FIGS. 10 and 11 may be performed repeatedly. The method may for example be repeated every frame, or at certain preset time intervals, or in any other suitable manner. This setting may for instance be preset in the eye tracking system 200.

It should be noted that the adjustments/increases/decreases of illumination power described in connection with FIGS. 10 and 11 are small additional adjustments in illumination power, which do not correspond to changing between the first to second illumination power levels in FIG. 9.

In combination with any of the embodiments presented herein for controlling an eye tracking system 200, the method may further comprise detecting a pupil in an image, using the eye tracking system 200, and/or performing eye tracking.

The processing circuitry 210 may correspondingly be configured to performing any or all of the method embodiments described herein.

FURTHER EMBODIMENTS

In one or more embodiment, there is provided a non-transitory computer-readable storage medium storing instructions which, when executed by processing circuitry 210 of the system 200, cause the system 200 to perform the method as defined in any of the method embodiments disclosed herein (in other words, in the claims, the summary, or the detailed description).

The non-transitory computer-readable storage medium may store instructions which, when executed by processing circuitry 210 of the system 200, cause the system 200 to obtain, in the eye tracking system 200, a first image captured using a camera 110 associated with the eye tracking system 200, the first image comprising at least part of an iris 101 and at least part of a pupil 102 of the eye 100 illuminated by an illuminator 112 associated with the eye tracking system 200 at a current power of illumination $P_{CURRENT}$ selected from a set of a first predetermined power level $PL_1$ and a second predetermined power level $PL_2$, wherein the value of the first predetermined power level $PL_1$ is different from the value of the second predetermined power level $PL_2$; obtain, in the eye tracking system 200, pixel coordinates of at least one pixel in the first image that is associated with the iris 101 of the eye 100 and pixel coordinates of at least one pixel associated with the pupil 102 of the eye 100; determine, by the eye tracking system 200, a contrast value of the first image as a function $f(x_1, x_2)$, wherein $x_1$ is an intensity value of the at least one pixel in the first image that is associated with the iris 101 and wherein $x_2$ is an intensity value of the at least one pixel in the first image that is associated with the pupil 102; compare by the eye tracking system 200, the contrast value of the first image to a minimum contrast value calculated as the function $f(x_1, x_2)$ when $x_1=x_2$; and if the contrast value of the first image deviates less than a preset deviation threshold value $T_{DEV}$ from the minimum contrast value, set, by the eye tracking system 200, the current power of illumination $P_{CURRENT}$ of the illuminator 112 to the other predetermined power level in the set of predetermined power levels $PL_1$, $PL_2$.

In one or more embodiments, the non-transitory computer-readable storage medium may further store instructions which, when executed by processing circuitry 210 of the system 200, cause the system 200 to perform the method defined in any of the method embodiments. In some embodiments, the non-transitory computer-readable storage medium may further store instructions which, when executed by processing circuitry 210 of the system 200, cause the system 200 to perform the method defined in any of the method embodiments repeatedly.

The non-transitory computer-readable storage medium may for example be provided in a computer program product. In other words, a computer program product may for example comprise a non-transitory computer-readable storage medium storing instructions which, when executed by the processing circuitry 210 of the system 200, cause the system 200 to perform the method as defined in any of the method embodiments.

As described above with reference to FIG. 2, the storage medium need not necessarily be comprised in the system 200.

The person skilled in the art realizes that the present invention is by no means limited to the preferred embodiments described above. On the contrary, many modifications and variations are possible within the scope of the appended claims. For example, the embodiments described above with reference to FIG. 9 may, as explained herein, be performed in different orders and/or be combined with additional method steps to form further embodiments. Further, it will be appreciated that the system 200 shown in FIG. 2 is merely intended as an example, and that other systems may also perform the methods described above with reference to FIG. 9.

It will be appreciated that the processing circuitry 210 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A method for controlling an eye tracking system, the method comprising:
   obtaining, in the eye tracking system, a first image captured using a camera associated with the eye tracking system, the first image comprising at least part of an iris and at least part of a pupil of the eye illuminated by an illuminator associated with the eye tracking system at a current power of illumination selected from a set of a first predetermined power level and a second predetermined power level, wherein the value of the first predetermined power level is different from the value of the second predetermined power level;
   obtaining, in the eye tracking system, pixel coordinates of at least one pixel in the first image that is associated with the iris of the eye and pixel coordinates of at least one pixel associated with the pupil of the eye;
   determining, by the eye tracking system, a contrast value of the first image as a function $f(x_1, x_2)$, wherein $x_1$ is an intensity value of the at least one pixel in the first image that is associated with the iris and wherein $x_2$ is an intensity value of the at least one pixel in the first image that is associated with the pupil;
   comparing, by the eye tracking system, the contrast value of the first image to a minimum contrast value calculated as the function $f(x_1, x_2)$ when $x_1=x_2$; and
   if the contrast value of the first image deviates less than a preset deviation threshold value from the minimum contrast value, setting, by the eye tracking system, the current power of illumination of the illuminator to the other predetermined power level in the set of predetermined power levels ($PL_1$, $PL_2$).

2. The method of claim 1, wherein the method is performed repeatedly.

3. The method of claim 1, wherein:
   one of the first predetermined power level and the second predetermined power level is within a first predetermined range including the maximum illumination power of the illuminator and power values directly below the maximum illumination power to a first preset threshold value; and
   the other one of the first and second predetermined power levels is within a second predetermined range including a predetermined minimum threshold value and power values directly above the predetermined minimum threshold value to a second preset threshold value.

4. The method of claim 3, wherein the first image comprises at least part of an iris and at least part of a pupil of the eye illuminated by the illuminator at the predetermined power level within the first predetermined range, and wherein the current power of illumination of the illuminator has then been set to the predetermined power level within the second predetermined range, the method further comprising:
   a) obtaining a second image, captured using the camera associated with the eye tracking system, the second image comprising at least part of an iris and at least part of a pupil of the eye illuminated by the illuminator at the predetermined power level within the second predetermined range;
   b) detecting, by the eye tracking system, any glint present in the second image; and
   c) if no glint can be detected in the second image, increasing the current power of illumination by a first preset amount, by the eye tracking system, and repeating steps a to c.

5. The method of claim 4, further comprising, once a glint has been detected:
   a) obtaining a third image, captured using the camera associated with the eye tracking system, the third image comprising at least part of an iris and at least part of a pupil of the eye illuminated by the illuminator at the current power of illumination;
   b) obtaining, in the eye tracking system, pixel coordinates of at least one pixel in the third image that is associated with the iris of the eye and pixel coordinates of at least one pixel associated with the pupil of the eye;
   c) determining, by the eye tracking system, a contrast value of the third image as a function $f(x_1, x_2)$, wherein $x_1$ is an intensity value of the at least one pixel in the third image that is associated with the iris and wherein $x_2$ is an intensity value of the at least one pixel in the third image that is associated with the pupil; and
   d) if the contrast value of the third image deviates less than the preset deviation threshold value from the minimum contrast value, decreasing the current power of illumination by a second preset amount, by the eye tracking system, and repeating steps a to d.

6. The method of claim 1, further comprising detecting, by the eye tracking system, a pupil of an eye of a user of the eye tracking system.

7. The method of claim 1, further comprising performing eye tracking, using the eye tracking system.

8. An eye tracking system, the system comprising processing circuitry configured to:
   obtain an first image captured using a camera associated with the eye tracking system, the image comprising at least part of an iris and at least part of a pupil of the eye illuminated by an illuminator associated with the eye tracking system at a current power of illumination selected from a set of a first predetermined power level and a second predetermined power level, wherein the value of the first predetermined power level is different from the value of the second predetermined power level;
   obtain pixel coordinates of at least one pixel in the image that is associated with the iris of the eye and pixel coordinates of at least one pixel associated with the pupil of the eye;
   determine a contrast value of the first image as a function $f(x_1, x_2)$, wherein $x_1$ is an intensity value of the at least one pixel in the first image that is associated with the iris and wherein $x_2$ is an intensity value of the at least one pixel in the first image that is associated with the pupil;

compare the contrast value of the first image to a minimum contrast value calculated as the function $f(x_1, x_2)$ when $x_1=x_2$; and if the contrast value of the first image deviates less than a preset deviation threshold value from the minimum contrast value, set the current power of illumination of the illuminator to the other predetermined power level in the set of predetermined power levels.

9. The system of claim 8, wherein the processing circuitry is configured to perform the steps of claim 8 repeatedly.

10. The system of claim 8, wherein:
one of the first predetermined power level and the second predetermined power level is within a first predetermined range including the maximum illumination power of the illuminator and power values directly below the maximum illumination power to a first preset threshold value; and
the other one of the first and second predetermined power levels is within a second predetermined range including a predetermined minimum threshold value and power values directly above the predetermined minimum threshold value to a second preset threshold value.

11. The system of claim 10, wherein the first image comprises at least part of an iris and at least part of a pupil of the eye illuminated by the illuminator at the predetermined power level within the first predetermined range, and wherein the current power of illumination of the illuminator has then been set to the predetermined power level within the second predetermined range, wherein the processing circuitry is further configured to:
a) obtain a second image, captured using the camera associated with the eye tracking system, the second image comprising at least part of an iris and at least part of a pupil of the eye illuminated by the illuminator at the predetermined power level within the second predetermined range;
b) detect any glint present in the second image; and
c) if no glint can be detected in the second image, increase the current power level of illumination by a first preset amount, and repeat steps a to c.

12. The system of claim 10, wherein the processing circuitry is further configured to, once a glint has been detected:
a) obtain a third image, captured using the camera associated with the eye tracking system, the third image comprising at least part of an iris and at least part of a pupil of the eye illuminated by the illuminator at the current power of illumination;
b) obtain pixel coordinates of at least one pixel in the third image that is associated with the iris of the eye and pixel coordinates of at least one pixel associated with the pupil of the eye;
c) determine a contrast value of the third image as a function $f(x_1, x_2)$, wherein $x_1$ is an intensity value of the at least one pixel in the third image that is associated with the iris and wherein $x_2$ is an intensity value of the at least one pixel in the third image that is associated with the pupil; and
d) if the contrast value of the third image deviates less than the preset deviation threshold value from the minimum contrast value, decrease the current power level of illumination by a second preset amount, and repeating steps a to d.

13. The system of claim 8, wherein the processing circuitry is further configured to detect a pupil of an eye of a user of the eye tracking system.

14. The system of claim 8, further configured to perform eye tracking.

15. A non-transitory computer-readable storage medium storing instructions which, when executed by processing circuitry of a system, cause the system to:
obtain, in the eye tracking system, a first image captured using a camera associated with the eye tracking system, the first image comprising at least part of an iris and at least part of a pupil of the eye illuminated by an illuminator associated with the eye tracking system at a current power of illumination selected from a set of a first predetermined power level and a second predetermined power level, wherein the value of the first predetermined power level is different from the value of the second predetermined power level;
obtain, in the eye tracking system, pixel coordinates of at least one pixel in the first image that is associated with the iris of the eye and pixel coordinates of at least one pixel associated with the pupil of the eye;
determine, by the eye tracking system, a contrast value of the first image as a function $f(x_1, x_2)$, wherein $x_1$ is an intensity value of the at least one pixel in the first image that is associated with the iris and wherein $x_2$ is an intensity value of the at least one pixel in the first image that is associated with the pupil;
compare by the eye tracking system, the contrast value of the first image to a minimum contrast value calculated as the function $f(x_1, x_2)$ when $x_1=x_2$; and
if the contrast value of the first image deviates less than a preset deviation threshold value from the minimum contrast value, set, by the eye tracking system, the current power of illumination of the illuminator to the other predetermined power level in the set of predetermined power levels.

16. The non-transitory computer-readable storage medium of claim 15 further storing instructions which, when executed by processing circuitry of a system, cause the system to perform the method repeatedly.

17. The non-transitory computer-readable storage medium of claim 15, further storing instructions which, when executed by processing circuitry of a system, cause the system to perform the method steps of:
obtaining, in the eye tracking system, a first image captured using a camera associated with the eye tracking system, the first image comprising at least part of an iris and at least part of a pupil of the eye illuminated by an illuminator associated with the eye tracking system at a current power of illumination selected from a set of a first predetermined power level and a second predetermined power level, wherein the value of the first predetermined power level is different from the value of the second predetermined power level;
obtaining, in the eye tracking system, pixel coordinates of at least one pixel in the first image that is associated with the iris of the eye and pixel coordinates of at least one pixel associated with the pupil of the eye;
determining, by the eye tracking system, a contrast value of the first image as a function $f(x_1, x_2)$, wherein $x_1$ is an intensity value of the at least one pixel in the first image that is associated with the iris and wherein $x_2$ is an intensity value of the at least one pixel in the first image that is associated with the pupil;
comparing, by the eye tracking system, the contrast value of the first image to a minimum contrast value calculated as the function $f(x_1, x_2)$ when $x_1=x_2$;
if the contrast value of the first image deviates less than a preset deviation threshold value from the minimum contrast value, setting, by the eye tracking system, the current power of illumination of the illuminator to the other predetermined power level in the set of predetermined power levels ($PL_1$, $PL_2$);

wherein one of the first predetermined power level and the second predetermined power level is within a first predetermined range including the maximum illumination power of the illuminator and power values directly below the maximum illumination power to a first preset threshold value; and the other one of the first and second predetermined power levels is within a second predetermined range including a predetermined minimum threshold value and power values directly above the predetermined minimum threshold value to a second preset threshold value.

* * * * *